(12) United States Patent
Vedula

(10) Patent No.: US 7,970,744 B2
(45) Date of Patent: Jun. 28, 2011

(54) MINIMIZING PROBLEMS IN ACCESSING REFERRED CONTENT

(75) Inventor: Venkata Naga Ravikiran Vedula, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 169 days.

(21) Appl. No.: 12/357,417

(22) Filed: Jan. 22, 2009

(65) Prior Publication Data

US 2009/0125795 A1 May 14, 2009

Related U.S. Application Data

(62) Division of application No. 10/908,218, filed on May 3, 2005, now abandoned.

(30) Foreign Application Priority Data

Mar. 21, 2005 (IN) .............................. 293/CHE/2005

(51) Int. Cl.
*G06F 7/00* (2006.01)
*G06F 17/00* (2006.01)
(52) U.S. Cl. ....................................................... 707/691
(58) Field of Classification Search .................. None
See application file for complete search history.

(56) References Cited

U.S. PATENT DOCUMENTS 6,681,369 B2  1/2004  Meunier et al.

OTHER PUBLICATIONS

Evans et al., "A Web-Based Migration Protocol Using WebDAV", WWW '02, pp. 263-271, 2002, ACM.*
Hugh C. Davis, "Referential Integrity of Links in Open Hypermedia Systems", Multicosm Ltd. and The Multimedia Research Group, pp. 207-216, The Department of Electronics an Computer Science, The University of Southampton, Southampton, SO 17 1BJ, UK.
Pentti A. Honkanen, The Integrity Problem, and What Can Be Done About It Usingtoday's Dbmss From the Database Fall', pp. 21-27, Georgia State University 1989.
Keith Shafer, Stuart Weibel, Erik Jul, Jon Fausey, "Introduction to Persistent Uniform Resource Locators", pp. 01-08, Downloaded Sep. 17, 2010.

* cited by examiner

*Primary Examiner* — Michael Hicks
(74) *Attorney, Agent, or Firm* — Narendra Reddy Thappeta

(57) ABSTRACT

According to an aspect of the present invention, information indicating the list of referrer documents referring to a referred document, is maintained. Thus, when the document identifier (name and directory location of the document) changes, the list of referrer documents that need to be changed can be easily identified. In an embodiment, the administrators of the referrer document are notified (e.g., by an automatic email) of the change of the document identifier of the referred document. According to another aspect of the present invention, a first mapping of the Uniform Resource Locator (URL) of each web accessible page/document to a virtual link is maintained in a web server. The content server maintains a second mapping of the virtual link to the document identifier. Thus, when the document identifier changes, only the second map in the content server needs to be updated for continued access of the content.

11 Claims, 6 Drawing Sheets

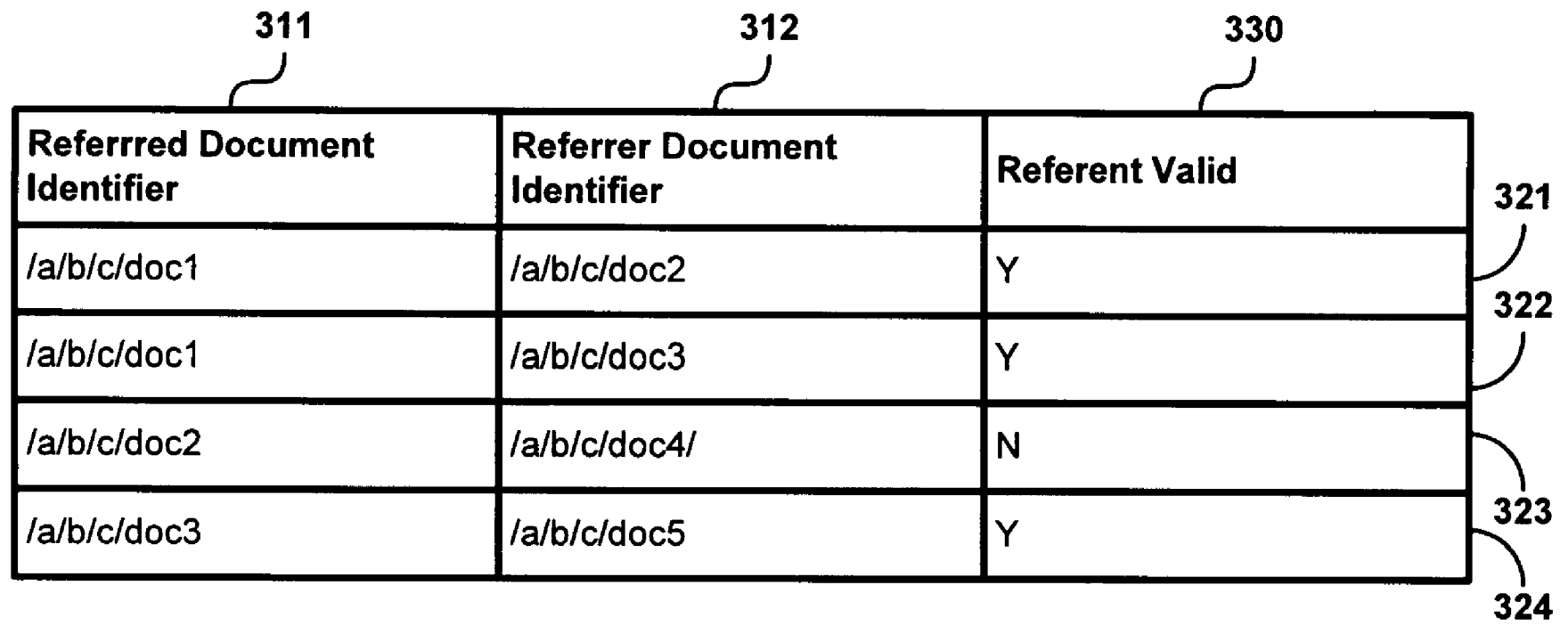

| Referred Document Identifier | Referrer Document Identifier | Referent Valid |
|---|---|---|
| /a/b/c/doc1 | /a/b/c/doc2 | Y |
| /a/b/c/doc1 | /a/b/c/doc3 | Y |
| /a/b/c/doc2 | /a/b/c/doc4/ | N |
| /a/b/c/doc3 | /a/b/c/doc5 | Y |

*FIG. 3*

MINIMIZING PROBLEMS IN ACCESSING REFERRED CONTENT

RELATED APPLICATION

The present application is a divisional of and claims priority from co-pending U.S. application Ser. No. 10/908,218, entitled, "Minimizing Problems in Accessing Referred Content", filed on May 3, 2005, and is incorporated in its entirety herewith.

BACKGROUND OF THE INVENTION

1. Field of the Invention

The present invention relates to content management in digital processing systems, and more specifically to a method and apparatus for minimizing problems in accessing referred content.

2. Related Art

There are often scenarios in which content ("referred content") from one source is referred to in the content of another source. For example, when a user accesses a web page, the web page may be defined to contain content of several files, and the web page delivered to the user contains the contents of all such files. The files thus accessed (and containing the referred content) are termed to as referred documents and the web page is termed as the referrer document.

While the referred content in the above example is provided as integral to the referrer document (for example, due to the definition of the web page), there are other scenarios in which the referred content is delivered external to the referrer document. As an illustration, many web pages often contain hyperlinks with an associated Uniform Resource Locator (URL), and a user selects the hyperlink to access the content of the (referred) document corresponding to the URL.

Users are known to experience problems in accessing referred content, typically because of changes to the document identifier of the referred documents or deletion of the referred documents themselves. A document identifier refers to a name/string (often including directory structure where the document is located), which is used to uniquely identify the document interfacing with the system software (e.g., operating system) executing on a system from which the document is accessible.

In such situations, user accessing content are displayed messages such as 'file not found' or a portion of the display containing blank. It is generally desirable that such access problems be avoided.

BRIEF DESCRIPTION OF THE DRAWINGS

The present invention will be described with reference to the accompanying drawings briefly described below.

FIG. 3 contains a table illustrating an example data structure used for maintaining a list of referring documents associated with each referred document according to an aspect of the present invention.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

Overview

According to an aspect of the present invention, data indicating the referrer documents corresponding to each referred document is maintained. Thus, when there is a change of the document identifier (either moved to a new location, deleted or renamed) of a referred document, the corresponding referrer documents which may require changes are easily identified. In one embodiment described below, the administrator corresponding to each of such identified referrer documents is notified of the change to the document identifier of the referred document.

According to another aspect of the present invention, a server ("web server"), processing requests for web pages identified by corresponding Uniform Resource Locators (URLs), maintains a map of the URL to a logical link. A content server providing the document corresponding to the URL maintains a mapping from the logical link to the document identifier.

Thus, when a web server receives a request for a web page identified by a URL, the web server maps the URL to a corresponding logical link and sends the logical link to a content server. The content server maps the logical link to the corresponding document identifier and causes the corresponding content to be provided to the user system requesting the web page.

If the document identifier of the referred document changes, the content server updates the map mapping the logical link to the corresponding document identifier. Thereafter, the content corresponding to the URL received by a web server continues to be provided to user systems sending the URL.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the present invention.

Example Environment

Figure 1:
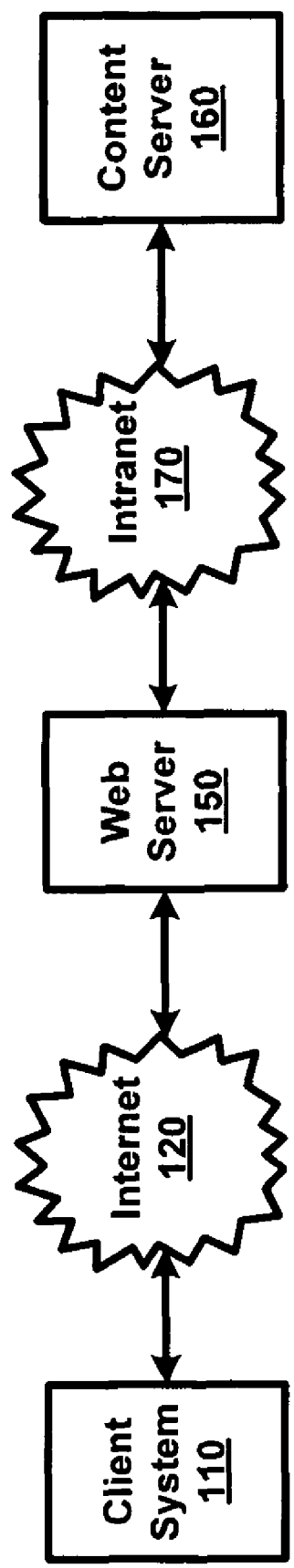
FIG. 1 is a block diagram of an example environment in which various aspects of the present invention can be implemented.

FIG. 1 is a block diagram illustrating an example environment in which various aspects of the present invention can be implemented. The environment is shown containing client system 110, Internet 120, web server 150, intranet 170, and content server 160. Each system is described below in further detail.

Internet 120 generally refers to a conglomeration of network connecting various systems (here, client system 110 and web server 150), and is implemented using protocols such as Internet Protocol (IP). Intranet 170 is also implemented using protocols such as IP, and is generally owned or operated by an organization providing the content/services. Intranet 170 provides connectivity between web server 150 and content server 160.

Content server 160 may store (or otherwise provide access to) content of various web pages. Client system 110A may execute software such as browsers enabling a user to specify specific web pages of interest. The Uniform Resource Locator (URL) corresponding to the specified web pages are forwarded to web server 150 via Internet 120.

Web server 150 receives the URLs and any associated parameters, and causes the content corresponding to the URL to be served to client system 110. If the content is present on content server 160, web server 150 interfaces with content server 160 to serve the content. Often times web server 150 itself stores the content. Various aspects of the present invention minimize problems while providing access to the content as described below.

Method

Figure 2:
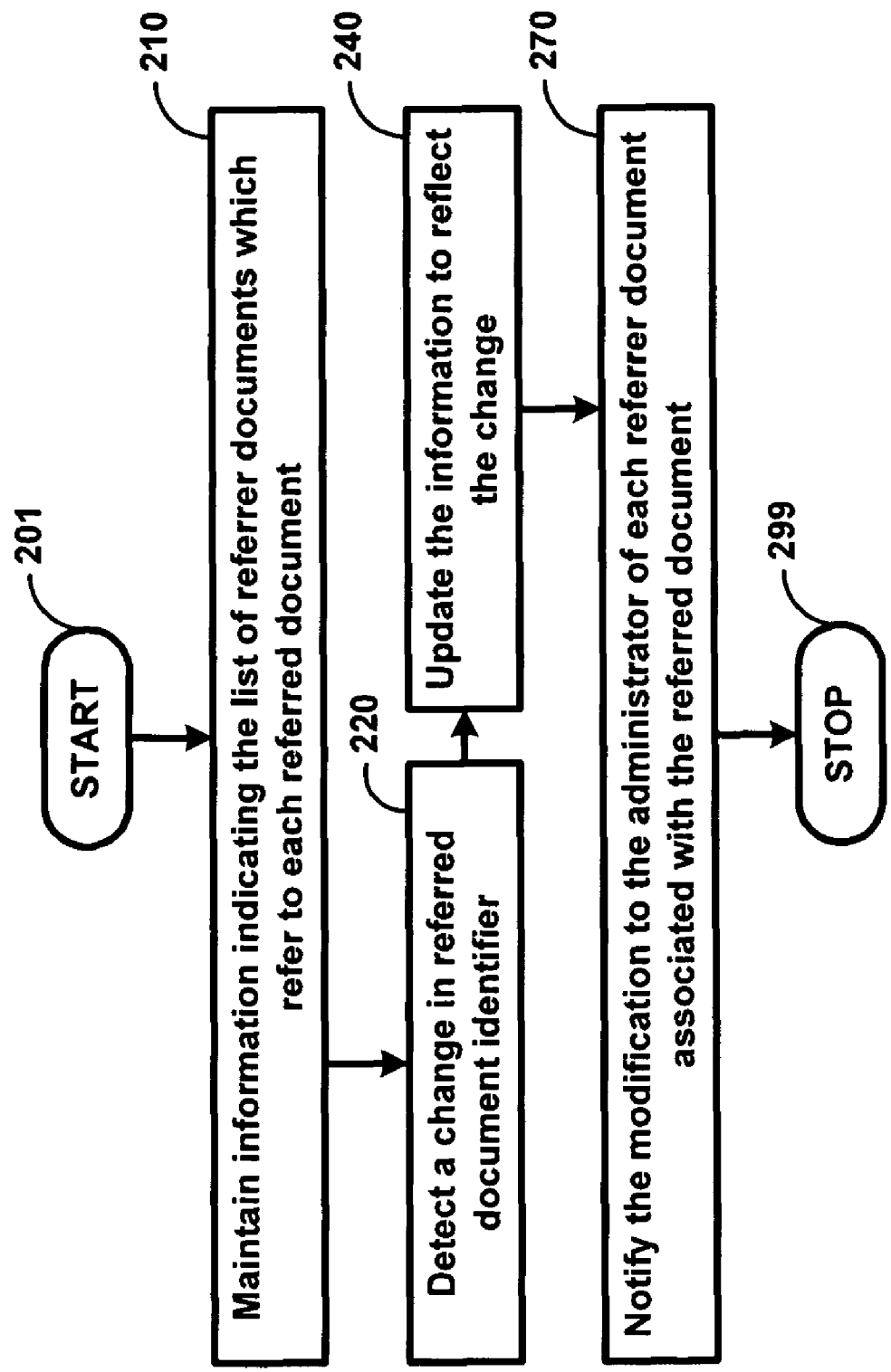
FIG. 2 is a flow-chart illustrating the manner in which problems in accessing referred documents can be minimized according to an aspect of the present invention.

FIG. 2 is a flow-chart illustrating the manner in which a server system (e.g., content server 160) minimizes problems in accessing referred content according to an aspect of the present invention. The flow chart is described with reference to FIG. 1 merely for illustration. However, the features can be implemented in other environments as well. The flow chart begins in step 201, in which control immediately passes to step 210.

In step 210, content server 160 maintain information indicating the list of referrer documents which refer to each referred document. FIG. 3 illustrates an example table containing such information. Column 311 and 312 respectively contain the document identifiers of the referred and referrer documents. As depicted there in rows 321 and 322, a document with name doc1 (and contained in a directory /a/b/c) is referred by documents doc2 and doc3 (in directory /a/b/c). Column 330 indicates whether the referred document identifier is valid (i.e., not delete from content server 160).

Continuing with reference to FIG. 2, in step 220, content server 160 detects a change in the referred document identifier, for example, when the referred document is moved to a different location or deleted. Such changes are often implemented in the 'drivers' or other components of the system software, and the detection task may be implemented associated with the drivers/system software. Such implementations will be apparent to one skilled in the relevant arts by reading the disclosure provided herein.

In step 240, content server 160 updates the information to reflect the change. For example, if the referred document is deleted, the corresponding row in valid column 330 is set to N (not valid) as depicted in row 323. On the other hand if the referred document is moved, the corresponding row in referred column 311 is modified to reflect the new document identifier (after the move).

In step 270, content server 160 notifies (e.g., by email) the modification to the administrator of each referrer document associated with the referred document. The administrator can then take appropriate action, such as changing the document identifier in the corresponding referrer documents. The flowchart ends in step 299.

Due to the notification to administrator, the problems in accessing content may be reduced since the administrator can take appropriate actions. One problem with the approach of above is that the administrator intervention is relied upon for corrections needed for continued access to the referred content. The below noted approach overcomes some of such problems as described below.

Alternative Approach

Figures 4A, 4B:
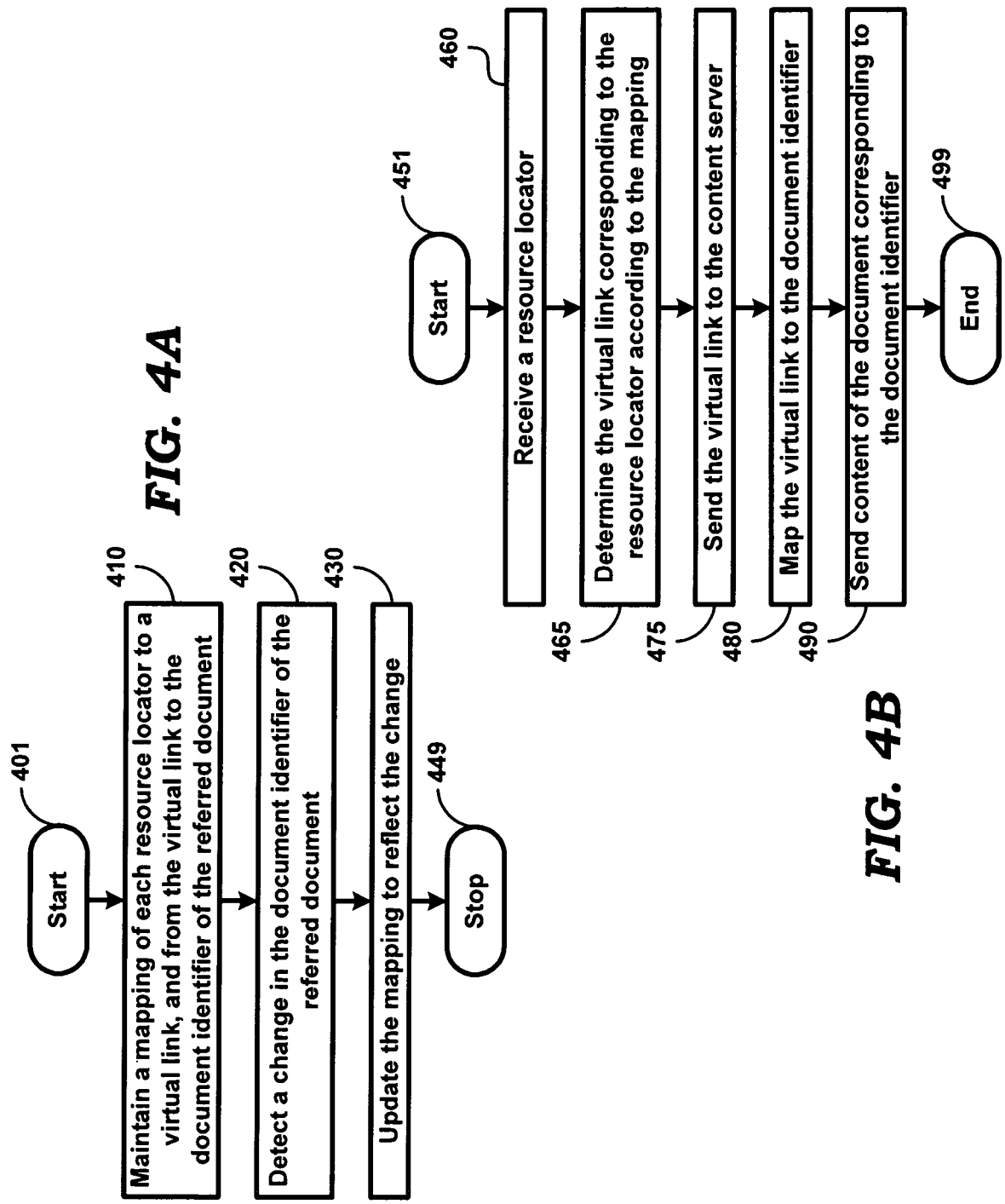
FIG. 4A is a flow-chart illustrating the manner in which a web server and a content server together may minimize errors while accessing contents corresponding to referred documents.
FIG. 4B is a flow-chart illustrating the manner in which a web server and a content server together process a request for providing contents of a referred document according to an aspect of the present invention.

FIG. 4A is a flowchart illustrating the manner in which problems in accessing content may be minimized according another aspect of the present invention. The flow chart is described with reference to FIG. 1 merely for illustration. However, the features can be implemented in other environments as well. The flow chart begins in step 401, in which control immediately passes to step 410.

In step 410, a first map mapping each resource locator to a virtual link, and a second map mapping the virtual link to the document identifier of the document is maintained. Web server 150 may maintain the first map and content server 160 may maintain the second map, as respectively shown with respect to FIGS. 5A and 5B. These tables can be contained within a database.

Figure 5A:
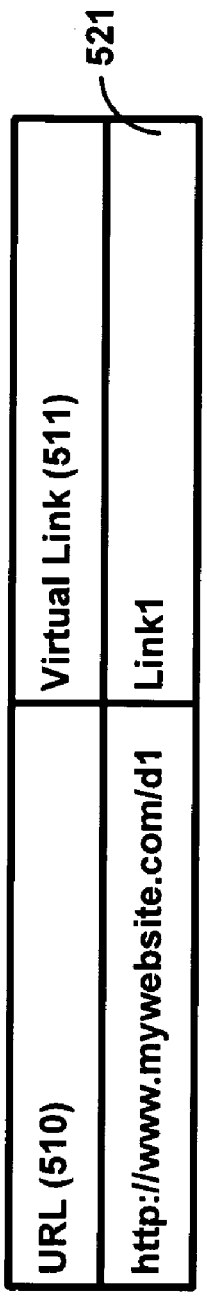
FIG. 5A depicts a data structure used for maintaining mapping of a Universal Resource Locator (URL) to a corresponding virtual link in an embodiment of the present invention.
Figure 5B:
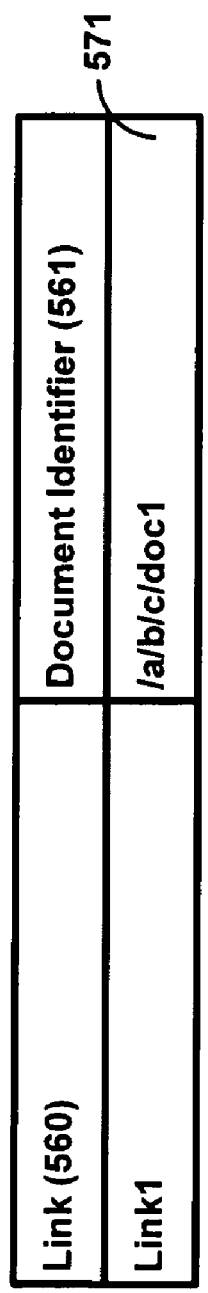
FIG. 5B depicts a data structure used for maintaining the mapping of a virtual link to corresponding document identifier in an embodiment of the present invention.

As shown, columns 510 and 511 in FIG. 5A respectively contain URL and the virtual link (identifier), and columns 560 and 561 in FIG. 5B respectively contain the virtual link to the document identifier. Thus, a URL of http://www.mywebsite.com/d1 is shown mapped to link1 by row 521 of FIG. 5A, and row 571 of FIG. 5B is shown mapping link1 to /a/b/c/doc1. The other mappings are similarly described. It should be appreciated that the two maps can be combined into a single map. In addition, web server 150 and content server 160 can be integrated as a single physical unit.

Figure 5C:
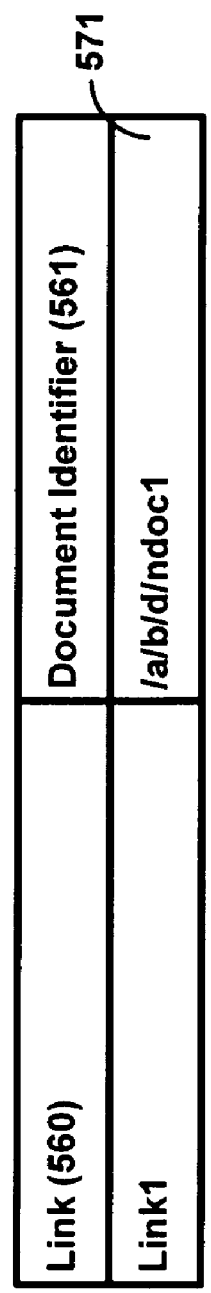
FIG. 5C depicts a data structure illustrating the changes to be made in the data structure of FIG. 5B when a document identifier changes, in an embodiment of the present invention.

Continuing with combined reference to FIGS. 4, 5A, 5B and 5C, in step 420, content server 160 detects a change in the document identifier of the referred document. The detection can be performed similar to in step 220 described above. In step 430, content server 160 updates the second mapping to reflect the changes. Assuming doc1 has been moved to a new directory a/b/d and with a new name ndoc1, FIG. 5C depicts the corresponding second map. In particular, row 571 is shown changed to indicate the changed document identifier. The flowchart ends in step 449.

Due to the updating of the second map (from the logical link to the document identifier), user accesses can continue without substantial disruption even when the document identifier changes, as further described below with reference to FIG. 4B.

FIG. 4B is a flowchart illustrating the manner in which content of web pages is accessed consistent with the approach of FIG. 4A, in an embodiment of the present invention. The flow chart begins in step 451, in which control immediately passes to step 460.

In step 460, web server 150 receives a resource locator (URL) from client system 110. The URL may be received when a user at the client system selects a hyperlink encoding the URL in a referring document. The manner in which the web page (content of the referred document) corresponding to the URL is retrieved is described below.

In step 465, web server 150 determines the virtual link corresponding to the resource locator according to the mapping of FIG. 5A. In step 475, web server 150 sends the virtual link to content server 160. The interface between web server 150 and content server 160 can be implemented using any compatible approach, as will be apparent to one skilled in the relevant arts.

In step 480, content server 160 maps the virtual link to the document identifier using the mapping of FIG. 5B/5C. Since the mapping is updated to reflect any changes in the document identifier, the file/document corresponding to the URL of step 460 is readily accessed. In step 490, content server 160 sends the content of the accessed document (either to web server 150 or client system 110 directly, depending on the specific approach used in the environment). The flowchart ends in step 499.

Thus, using the approaches described above either alone or in combination, one may minimize problems in accessing referred content. The approaches may be implemented in various embodiments. The description is continued with respect to embodiments in which the aspects of the invention are operative when appropriate software instructions are executed.

Digital Processing System

Figure 6:
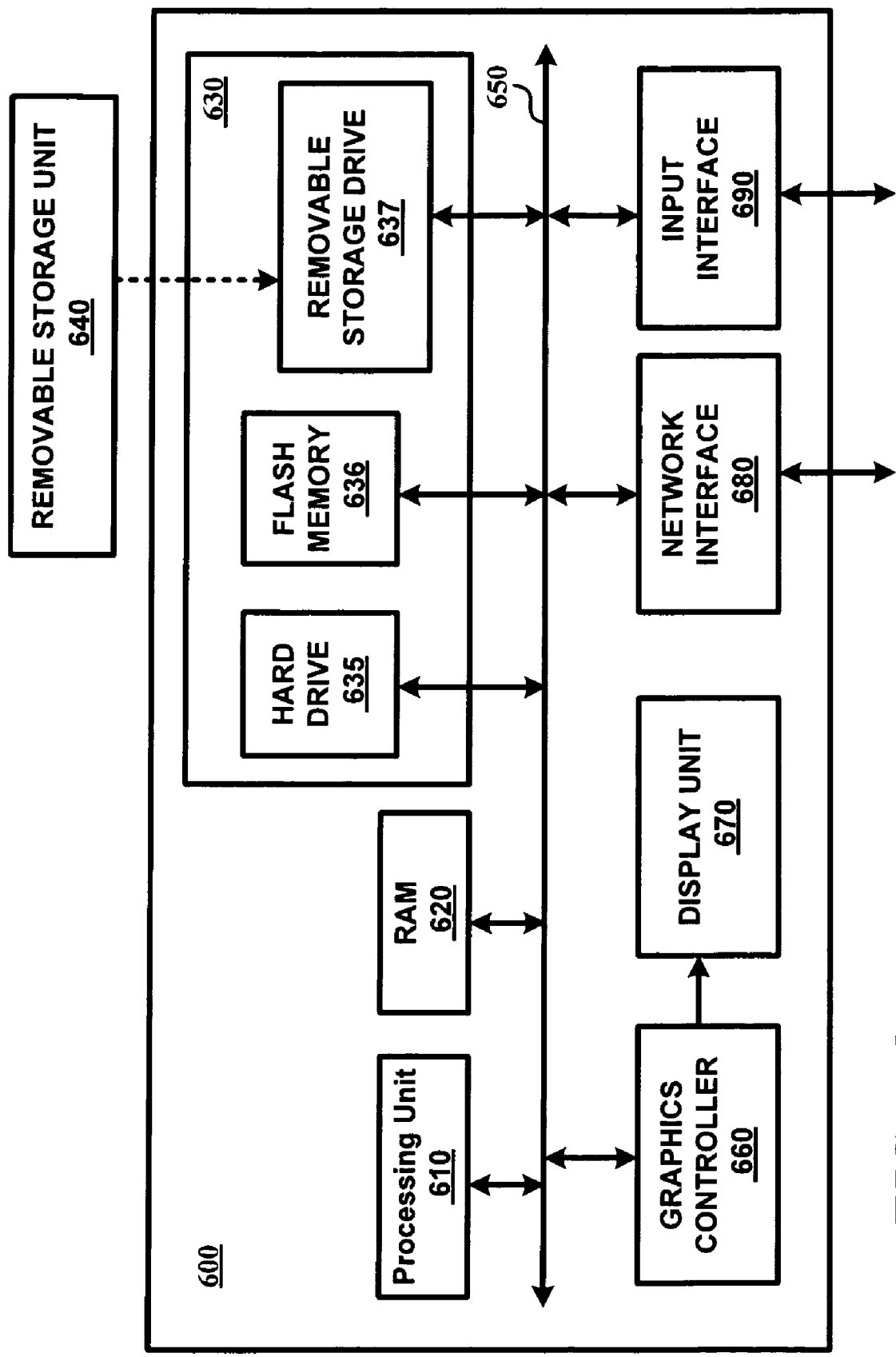
FIG. 6 is a block diagram illustrating an example embodiment in which various aspects of the present invention are operative when software instructions are executed.

FIG. 6 is a block diagram illustrating the details of digital processing system 600 in which various aspects of the present invention are operative by execution of appropriate software instructions. Digital processing system 600 may correspond to content server 160 and/or web server 150. Digital processing system 600 may contain one or more processors such as central processing unit (CPU) 610, random access memory (RAM) 620, secondary memory 630, graphics controller 660, display unit 670, network interface 680, and input interface 690. All the components except display unit 670 may communicate with each other over communication path 650, which may contain several buses as is well known in the relevant arts. The components of FIG. 6 are described below in further detail.

CPU 610 may execute instructions stored in RAM 620 to provide several features of the present invention. CPU 610 may contain multiple processing units, with each processing unit potentially being designed for a specific task. Alternatively, CPU 610 may contain only a single general purpose processing unit. RAM 620 may receive instructions from secondary memory 630 using communication path 650.

Graphics controller 660 generates display signals (e.g., in RGB format) to display unit 670 based on data/instructions received from CPU 610. Display unit 670 contains a display screen to display the images defined by the display signals. Input interface 690 may correspond to a key-board and/or mouse. Network interface 680 provides connectivity to a network (e.g., using Internet Protocol). In the case of web server 150, network interface 680 provides network connectivity to both Intranet 170 and Internet 120, and in the case of content server 160 network interface 680 provides network connectivity to Intranet 170.

Secondary memory 630 may contain hard drive 635, flash memory 636 and removable storage drive 637. Secondary memory 630 may store the data and software instructions, which enable digital processing system 600 to provide several features in accordance with the present invention. Some or all of the data and instructions may be provided on removable storage unit 640, and the data and instructions may be read and provided by removable storage drive 637 to CPU 610. Floppy drive, magnetic tape drive, CD-ROM drive, DVD Drive, Flash memory, removable memory chip (PCMCIA Card, EPROM) are examples of such removable storage drive 637.

Removable storage unit 640 may be implemented using medium and storage format compatible with removable storage drive 637 such that removable storage drive 637 can read the data and instructions. Thus, removable storage unit 640 includes a computer readable storage medium having stored therein computer software and/or data.

In this document, the term "computer program product" is used to generally refer to removable storage unit 640 or hard disk installed in hard drive 635. These computer program products are means for providing software to digital processing system 600. CPU 610 may retrieve the software instructions, and execute the instructions to provide various features of the present invention described above.

CONCLUSION

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents. Also, the various aspects, features, components and/or embodiments of the present invention described above may be embodied singly or in any combination in a data storage system such as a database system.

What is claimed is:

1. A method of minimizing problems in accessing a web page corresponding to a first Uniform Resource Locator (URL), said method comprising:

maintaining a first map from URLs to corresponding virtual links, wherein said first map maps said first URL to a first virtual link, said first map being in the form of a first plurality of rows, with each row containing a URL and a link identifier identifying the virtual link, said first virtual link being represented by a first link identifier in a first row of said first plurality of rows, said first row also containing said URL;

maintaining a second map from virtual links to corresponding document identifiers, wherein said second map maps said first virtual link to a first document identifier identifying a first document containing content corresponding to said first URL, said second map being in the form of a second plurality of rows, with each row containing said link identifier of a virtual link and a corresponding document identifier identifying the corresponding document, wherein a second row of said second plurality of rows contains said first link identifier and said first document identifier identifying said first document to indicate that said first document contains the content corresponding to said first link identifier;

changing said second row of said second map to reflect changes in said first document identifier;

receiving from a client system in a web server, said first URL as a part of a request, wherein said first URL is received after said first link identifier and said first URL are present in said first row of said first plurality of rows;

in response to receiving of said first URL, examining said first map in said web server to identify said first row as containing information related to said first URL;

determining in said web server said first link identifier corresponding to the resource locator according to said first row identified in said first map;

sending, from said web server, said first link identifier, identified in said determining, to a content server;

mapping, in said content server, said first link identifier to said document identifier according to said second map based on said first link identifier received from said web server;

retrieving, by said content server, a content of a document corresponding to said document identifier mapped to by said mapping; and sending, by said content server to said client system, said retrieved content as a response to said request.

2. The method of claim 1, wherein said first document identifier comprises a name and directory location,
wherein said first document has a first name and is placed in a first directory before a change, and has a second name and is placed in a second directory after a change,
wherein said second row contains said first name and identifier of said first directory before said change and said second name and identifier of said second directory after said change,
wherein said content of said document is returned in response to said request irrespective of whether said request is received before or after said change.

3. The method of claim 2, wherein said first map is accessible in said web server and said second map is accessible in said content server storing said first document.

4. The method of claim 2, wherein said client system receives no other packets as said response after sending of said request and prior to receiving of said content from said content server.

5. A computer readable medium carrying one or more sequences of instructions for causing one or more systems to minimize problems in accessing a web page corresponding to a first Uniform Resource Locator (URL), wherein execution of said one or more sequences of instructions by one or more processors contained in said one or more systems causes said one or more systems to perform the actions of:
maintaining a first map from URLs to corresponding virtual links, wherein said first map maps said first URL to a first virtual link,
said first map being in the form of a first plurality of rows, with each row containing a URL and a link identifier identifying the virtual link, said first virtual link being represented by a first link identifier in a first row of said first plurality of rows, said first row also containing said URL;
maintaining a second map from virtual links to corresponding document identifiers, wherein said second map maps said first virtual link to a first document identifier identifying a first document containing content corresponding to said first URL,
said second map being in the form of a second plurality of rows, with each row containing said link identifier of a virtual link and a corresponding document identifier identifying the corresponding document, wherein a second row of said second plurality of rows contains said first link identifier and said first document identifier identifying said first document to indicate that said first document contains the content corresponding to said first link identifier;
changing said second row of said second map to reflect changes in said first document identifier;
receiving from a client system in a web server, said first URL as a part of a request, wherein said first URL is received after said first link identifier and said first URL are present in said first row of said first plurality of rows;
in response to receiving of said first URL, examining said first map in said web server to identify said first row as containing information related to said first URL;

determining in said web server said first link identifier corresponding to the resource locator according to said first row identified in said first map;

sending, from said web server, said first link identifier, identified in said determining, to a content server;

mapping, in said content server, said first link identifier to said document identifier according to said second map based on said first link identifier received from said web server;

retrieving, by said content server, a content of a document corresponding to said document identifier mapped to by said mapping; and sending, by said content server to said client system, said retrieved content as a response to said request.

6. The computer readable medium of claim 5, wherein said first document identifier comprises a name and directory location,
wherein said first document has a first name and is placed in a first directory before a change, and has a second name and is placed in a second directory after a change,
wherein said second row contains said first name and identifier of said first directory before said change and said second name and identifier of said second directory after said change,
wherein said content of said document is returned in response to said request irrespective of whether said request is received before or after said change.

7. The computer readable medium of claim 5, wherein said first map is accessible in said web server and said second map is accessible in said content server storing said first document, wherein said web server and said content server are contained in said one or more systems.

8. The computer readable medium of claim 5, wherein said client system receives no other packets as said response prior to receiving of said content from said content server.

9. A set of systems comprising:
a web server to store a first map from URLs to corresponding virtual links, wherein said first map maps a first URL to a first virtual link, said first map being in the form of a first plurality of rows, with each row containing a URL and a link identifier identifying the virtual link, said first virtual link being represented by a first link identifier in a first row of said first plurality of rows, said first row also containing said URL to indicate that said first virtual link corresponds to said URL; and
a content server to maintain a second map from virtual links to corresponding document identifiers,
said second map being in the form of a second plurality of rows, with each row containing said link identifier of a virtual link and a corresponding document identifier identifying the corresponding document, wherein a second row of said second plurality of rows contains said first link identifier and a first document identifier identifying said first document to indicate that said first document stores content corresponding to said first URL,
wherein said web server is operable to:
receive said first URL from a client system in a request for the content of a document identified by said first URL, wherein said first URL is received after said first link identifier and said first URL are present in said first row of said first plurality of rows;
in response to receiving of said first URL, examine said first map in said web server to identify said first row as containing information related to said first URL;

determine said first link identifier corresponding to the resource locator according to said first row identified in said first map; and send said first link identifier to said content server;

wherein said content server, in response to receiving of said first link identifier, is operable to:

examine said second map to identify that said second row contains said received first link identifier;

map said first link identifier to said document identifier according to said second row identified in said examine; and send to said client system, as a response to said request, the content of a document corresponding to said mapped document identifier, wherein said client system receives the content corresponding to said URL in response to sending said request containing said URL to said web server, and wherein a change of said document identifier in said content server requires changing said second row to facilitate said client system to receive the content of said document even if said document identifier changes.

10. The set of systems of claim 9, wherein said first document identifier comprises a name and directory location, wherein said first document has a first name and is placed in a first directory before a change, and has a second name and is placed in a second directory after a change, wherein said second row contains said first name and identifier of said first directory before said change and said second name and identifier of said second directory after said change.

11. The set of systems of claim 9, wherein said client system receives no other packets as said response prior to receiving of said content from said content server.

* * * * *

UNITED STATES PATENT AND TRADEMARK OFFICE
CERTIFICATE OF CORRECTION

PATENT NO. : 7,970,744 B2  
APPLICATION NO. : 12/357417  
DATED : June 28, 2011  
INVENTOR(S) : Vedula It is certified that error appears in the above-identified patent and that said Letters Patent is hereby corrected as shown below:

On the Title Page, Item (56), under "Other Publications", line 5, delete "an" and insert -- and --, therefor.

On the Title Page, Item (56), under "Other Publications", line 8, delete "Usingtoday's" and insert -- Using today's --, therefor.

On sheet 3 of 6, in figure 3, Reference Numeral 311, line 1, delete "Referrred" and insert -- Referred --, therefor.

Signed and Sealed this
Fifteenth Day of November, 2011

David J. Kappos
*Director of the United States Patent and Trademark Office*